(12) United States Patent
Kontani et al.

(10) Patent No.: US 11,379,046 B2
(45) Date of Patent: Jul. 5, 2022

(54) INPUT DEVICE AND CONTROL METHOD

(71) Applicant: Panasonic Intellectual Property Management Co., Ltd., Osaka (JP)

(72) Inventors: Masaki Kontani, Osaka (JP); Hideaki Eto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/498,511

(22) Filed: Oct. 11, 2021

(65) Prior Publication Data

US 2022/0137707 A1 May 5, 2022

(30) Foreign Application Priority Data

Oct. 29, 2020 (JP) .............................. JP2020-181347

(51) Int. Cl.
*G06F 3/01* (2006.01)
*G06F 3/044* (2006.01)

(52) U.S. Cl.
CPC .............. *G06F 3/016* (2013.01); *G06F 3/044* (2013.01)

(58) Field of Classification Search
CPC ........ G06F 3/016; G06F 3/044; G06F 1/1626; G08C 17/00; H04M 1/72533; H04B 1/202; H04N 5/44582; H01H 9/0214; H01H 2009/0257
See application file for complete search history.

(56) References Cited

U.S. PATENT DOCUMENTS

| 10,747,332 | B2* | 8/2020 | Wang ..................... H01H 13/70 |
| 2011/0210834 | A1* | 9/2011 | Pasquero ............ G06F 3/04883 340/407.1 |
| 2011/0210926 | A1* | 9/2011 | Pasquero ................ G06F 3/016 715/702 |
| 2011/0304558 | A1* | 12/2011 | Pasquero ............... G06F 3/016 345/173 |
| 2020/0089328 | A1* | 3/2020 | Wang ...................... G06F 3/023 |
| 2020/0341559 | A1* | 10/2020 | Wang .................... G06F 3/0202 |

FOREIGN PATENT DOCUMENTS

| CN | 110140098 A | * 8/2019 | .......... B32B 27/065 |
| JP | 2020-24832 A | 2/2020 | |

* cited by examiner

*Primary Examiner* — Michael Pervan
(74) *Attorney, Agent, or Firm* — Seed IP Law Group LLP

(57) ABSTRACT

An input device includes: a surface layer; a design sheet disposed on a front surface side or a back surface side of the surface layer; a cushion layer disposed on the back surface side of the surface layer and having a void therein; a plate-shaped frame disposed on a side of the cushion layer opposite to the surface layer; a main body that movably holds the frame in a first direction, in which the surface layer and the frame are stacked, when the surface layer is pressed; and a push-in detector mechanically connected to the frame. The design sheet includes a first portion in which a design is disposed and a second portion in which the design is not disposed in a plan view, and each of the surface layer and the cushion layer extends across the first portion and the second portion in the plan view.

20 Claims, 9 Drawing Sheets

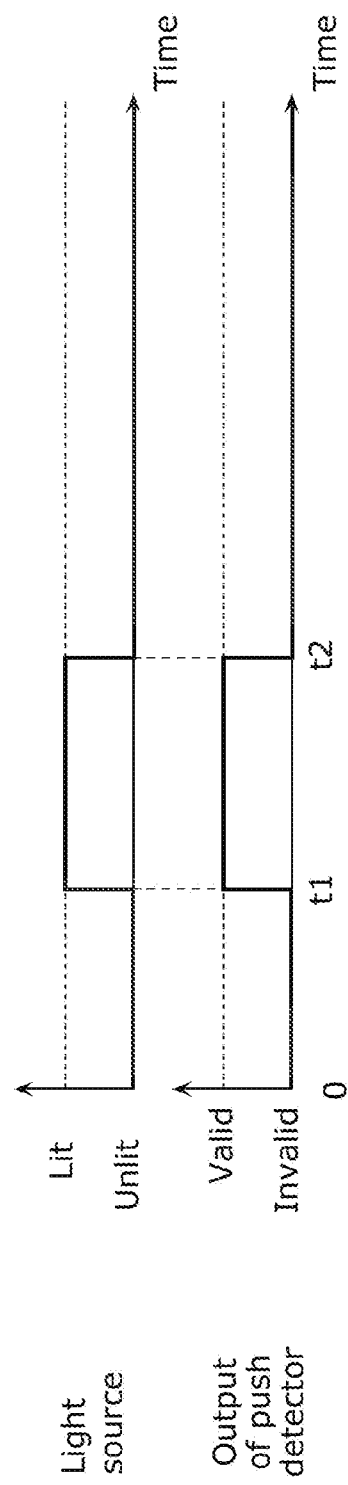

INPUT DEVICE AND CONTROL METHOD

CROSS REFERENCE TO RELATED APPLICATION

The present application is based on and claims priority of Japanese Patent Application No. 2020-181347 filed on Oct. 29, 2020.

FIELD

This disclosure relates to an input device and a control method.

BACKGROUND

Conventionally, an input device for receiving input from a user such as a driver is disposed in a vehicle such as an automobile. For example, Patent Literature (PTL) 1 discloses a switch device (input device) that allows a user to feel a soft operation feeling when operated.

CITATION LIST

Patent Literature

PTL 1: Japanese Unexamined Patent Application Publication No. 2020-24832

SUMMARY

However, the input device according to PTL 1 can be improved upon.

In view of this, the present disclosure provides an input device and a control method capable of improving upon the above related art.

The input device according to one aspect of the present disclosure includes: a surface layer; a design portion disposed on a side of a front surface or a side of a back surface of the surface layer; a cushion layer disposed on the side of the back surface of the surface layer and having a void in the cushion layer; a frame in a plate shape disposed on a side of the cushion layer which is opposite to a side of the cushion layer where the surface layer is located; a main body that movably holds the frame in a first direction in which the surface layer and the frame are stacked, when the surface layer is pressed; and a push-in detector that is mechanically connected to the frame, wherein the design portion includes a first portion in which a design is disposed and a second portion in which the design is not disposed in a plan view, and each of the surface layer and the cushion layer extends across each of the first portion and the second portion in the plan view.

The control method according to one aspect of the present disclosure is a control method of an input device, the input device including: a surface layer; a design portion disposed on a side of a front surface or a side of a back surface of the surface layer; a cushion layer disposed on the side of the back surface of the surface layer and having a void in the cushion layer; a frame in a plate shape disposed on a side of the cushion layer which is opposite to a side of the cushion layer where the surface layer is located; a main body that movably holds the frame in a direction, in which the surface layer and the frame are stacked, when the surface layer is pressed; a push-in detector that is mechanically connected to the frame; and a light source for illuminating the design on a side of the frame opposite to the cushion layer, wherein the design portion includes a first portion in which a design is disposed and a second portion in which the design is not disposed in a plan view, and each of the surface layer and the cushion layer extends across each of the first portion and the second portion in the plan view, the control method comprising: determining that a result of detecting by the push-in detector when the light source is lit and the first portion is operated is a valid detection result, and determining that a result of detecting by the push-in detector when the light source is not lit is an invalid detection result.

According to one aspect of the present disclosure, it is possible to realize an input device and the like capable of further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 9 is a timing chart showing the operation of the input device according to the embodiment.

DESCRIPTION OF EMBODIMENTS

Figure 1:
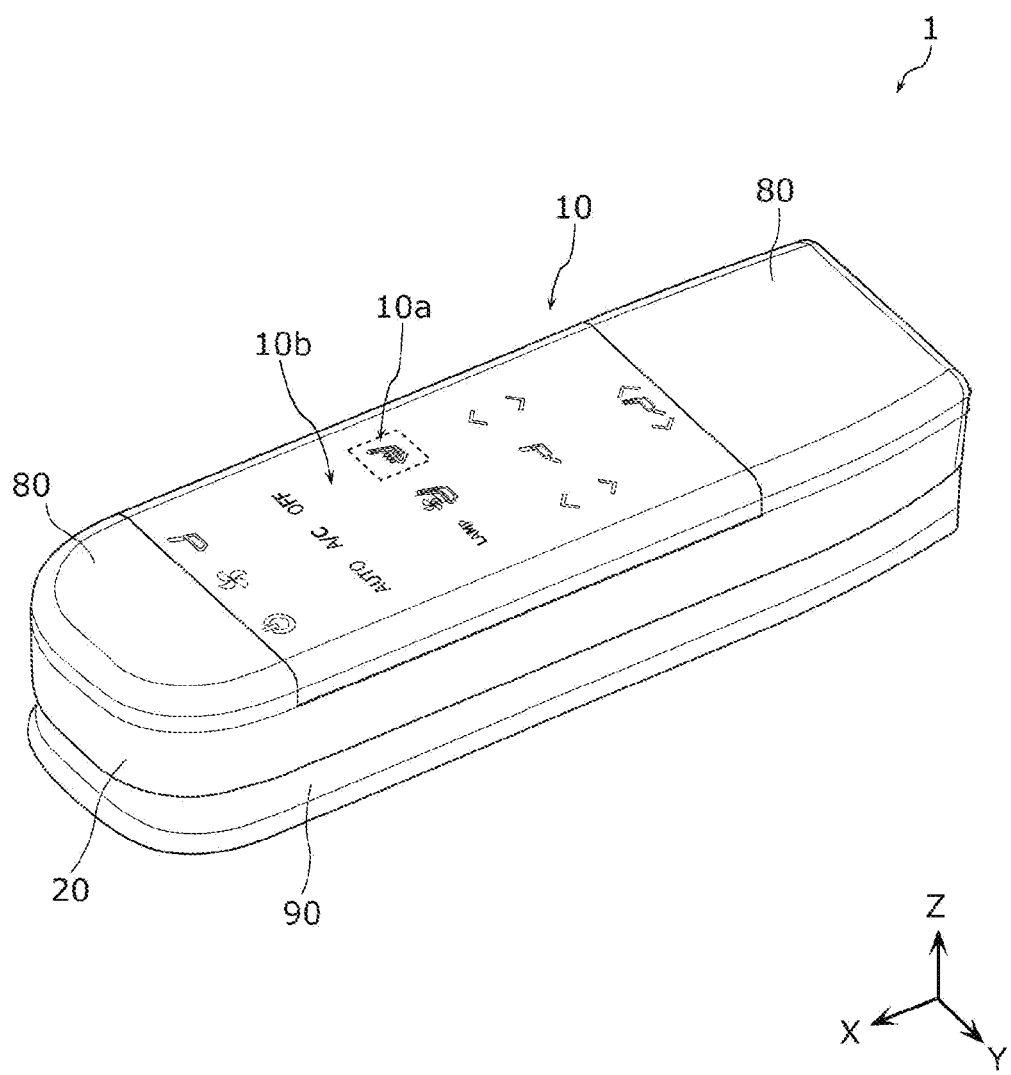
FIG. 1 is a perspective view showing an example of the appearance of an input device according to an embodiment.

Underlying Knowledge Forming Basis of the Present Disclosure

As described in "Background", the input device according to PTL 1 can be improved upon. For example, in an input device, it is desirable not to impart a sense of discomfort to the user when the user touches the input device, and the input device according to PTL 1 can be improved upon in terms of not imparting such sense of discomfort to the user. Therefore, the inventors of the present application have diligently studied an input device having a reduced sense of discomfort to the tactile sensation as a further improvement to the input device, and devised the following input device.

The input device according to one aspect of the present disclosure includes: a surface layer; a design portion disposed on a side of a front surface or a side of a back surface of the surface layer; a cushion layer disposed on the side of the back surface of the surface layer and having a void in the cushion layer; a frame in a plate shape disposed on a side of the cushion layer which is opposite to a side of the cushion layer where the surface layer is located; a main body that movably holds the frame in a first direction in which the surface layer and the frame are stacked, when the surface layer is pressed; and a push-in detector that is mechanically connected to the frame, wherein the design portion includes a first portion in which a design is disposed and a second portion in which the design is not disposed in a plan view, and each of the surface layer and the cushion layer extends across each of the first portion and the second portion in the plan view.

With this, the input device can have the same layer structure of the first portion and the second portion, so that the same tactile sensation can be applied to the user regardless of which of the first portion and the second portion is operated (pressed). In addition, since the input device includes a cushion layer, a soft tactile sensation can be applied when the user operates the input device. Therefore, the input device can reduce the discomfort to the tactile sensation between the first portion and the second portion while applying a soft tactile sensation when operated by the user.

In addition, for example, the design portion includes a design sheet, the design sheet is disposed between the surface layer and the frame, the surface layer, the cushion layer, and the frame are light-transmissive, and the input device may further comprise a light source for illuminating the design on a side of the frame opposite to the cushion layer.

With this, even when the input device has a configuration in which the design is displayed by the light from the light source, it is possible to reduce the discomfort to the tactile sensation while applying a soft tactile sensation when the user operates the input device.

In addition, for example, the design sheet is light-transmissive and includes a silicon rubber sheet on which the design is included, the first portion is a transmission region for forming the design, the transmission region being formed by printing on the silicon rubber sheet, and the second portion may be a light-shielding region formed by printing on the silicon rubber sheet.

With this, since the design sheet is a silicon rubber sheet with good printability, the design can be easily formed by printing. That is, the productivity of the input device that can reduce the discomfort to the tactile sensation while applying a soft tactile sensation when operated by the user is improved.

In addition, for example, the surface layer, the design sheet, and the cushion layer may cover an entire surface of the input device.

With this, the input device can reduce a sense of discomfort to the tactile sensation while applying a soft tactile sensation on the entire surface regardless of where the user operates.

In addition, for example, when the light source is lit and a region corresponding to the first portion is pressed, an output of the push-in detector may become valid.

With this, the input device can detect the user's operation when the light source is lit, so that the user's operation can be detected without omission. In addition, if the output of the push-in detector is invalid when the light source is unlit, it can be suppressed that the input device detects that the user has unintentionally touched the surface layer as an input.

In addition, for example, a light guide body may be included in a portion of the frame facing the design and the light source.

With this, the input device can make the light from the light source enter the desired region by the light guide body, so that the light leakage in the region where the design is not displayed can be suppressed.

In addition, for example, the design portion may be formed by printing the design on the front surface of the surface layer.

With this, the surface layer can comprise a material that does not have light-transmissiveness. In the input device, the surface layer comprises a material corresponding to the material of the portion where the input device is disposed, so that it is possible to further reduce a sense of discomfort to the tactile sensation between the portion and the surface layer.

In addition, for example, the push-in detector may be a tact switch.

With this, the input device can apply a tactile force sensation to the user by the metal dome included in the tact switch even when the input device does not include a vibration device.

In addition, for example, a vibration device that vibrates when it is detected that the surface layer is pressed by the push-in detector and is mechanically connected to the frame may be provided.

With this, the input device can apply a tactile force sensation to the user by vibration when the push-in detector detects the movement of the frame due to the operation on the surface layer.

In addition, for example, an electrostatic sensor film which is disposed on a side of the cushion layer which is opposite to a side of the cushion layer where the surface layer is located and extends across each of the first portion and the second portion in the plan view may be provided.

With this, the input device can suppress the occurrence of the difference in tactile sensation depending on the presence or absence of the electrostatic sensor film, so that a sense of discomfort to the tactile sensation can be further reduced. In addition, the input device can accurately detect the position operated by the user by the electrostatic sensor film.

In addition, for example, a plurality of designs are disposed in the design portion, each of the plurality of designs is the design, the electrostatic sensor film may be configured for respective electrostatic sensor electrodes to be arranged at positions facing the plurality of designs.

With this, the input device is configured to enable multiple inputs. In such an input device, for example, it is possible to reduce a sense of discomfort to the tactile sensation between the design and the adjacent design.

It should be noted that all of the embodiments described below show comprehensive or specific examples. Numerical values, shapes, materials, components, arrangement positions of components, connection forms, and the like shown in the following embodiments are examples, and are not intended to limit the present disclosure. In addition, among the components in the following embodiments, the components not described in the independent claims will be described as arbitrary components. In addition, each figure is a schematic view and is not necessarily exactly illustrated. In addition, in each figure, the same components are designated by the same reference numerals.

In addition, in the present specification, terms indicating relationships between elements such as equality, terms indicating the shape of elements such as plate-shaped and L-shaped, and numerical values are not expressions expressing only strict meanings, but expressions meaning that a substantially equivalent range, for example, a difference of about several percent is included.

In addition, coordinate axes may be shown in the drawings used for the description in the following embodiments. The Z-axis indicates the laminating direction in which the components of the input device are stacked. In addition, the X-axis direction and the Y-axis direction are directions orthogonal to each other on a plane perpendicular to the Z-axis direction. In addition, in the following embodiments, "planar view" means viewing from the Z-axis direction.

Embodiment

[1. Overall Configuration of Input Device]

Figure 2:
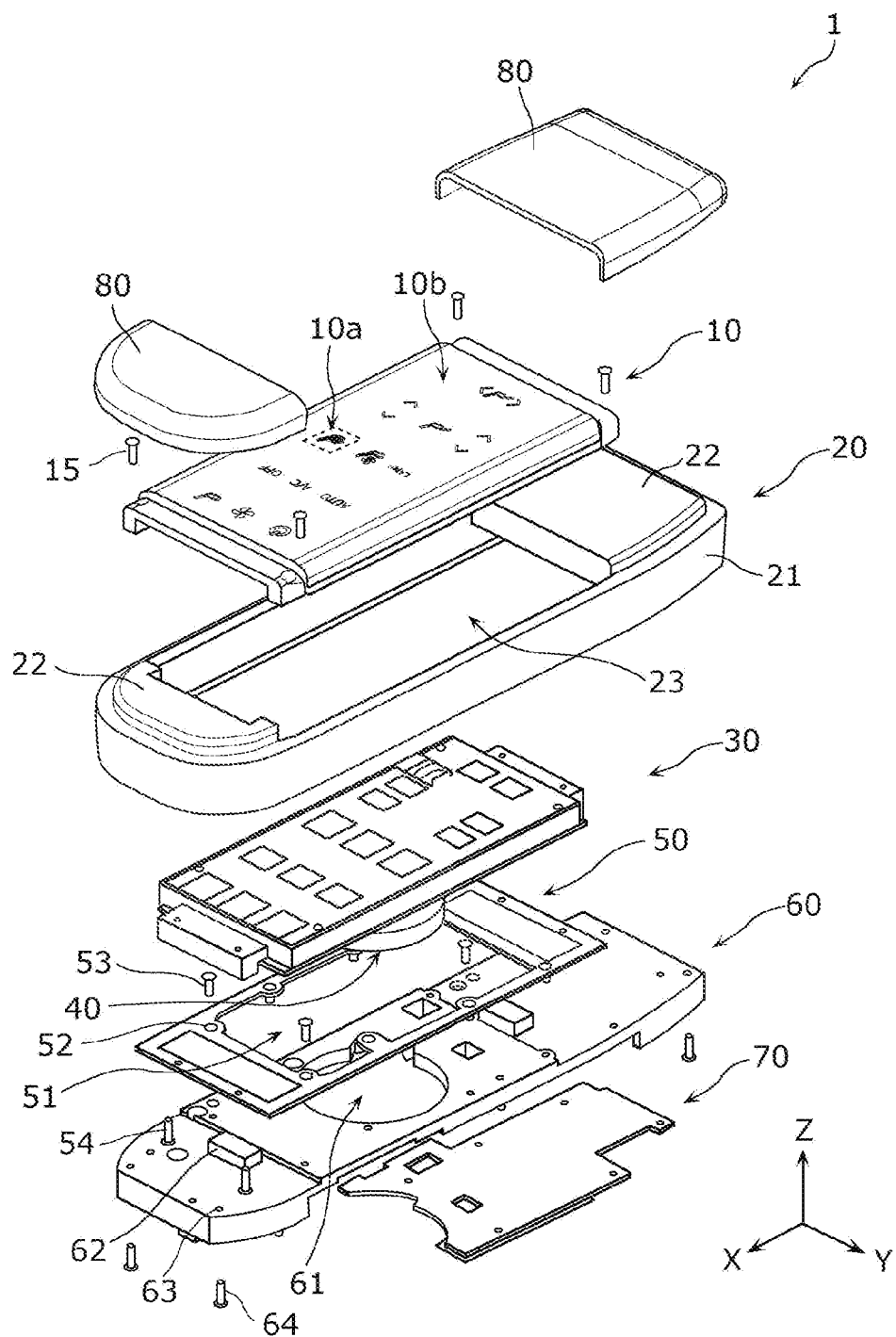
FIG. 2 is an exploded perspective view showing the input device according to the embodiment.

First, the overall configuration of input device 1 according to the present embodiment will be described with reference to FIG. 1 and FIG. 2. FIG. 1 is a perspective view showing an example of the appearance of input device 1 according to the present embodiment. FIG. 2 is an exploded perspective view showing input device 1 according to the present embodiment.

As shown in FIG. 1, input device 1 is a device that receives an input of an operation for controlling equipment included in an object (for example, a vehicle such as an automobile) on which input device 1 is mounted. Specifically, input device 1 receives a push-in operation (hereinafter, also simply referred to as an operation) on the surface of surface layer portion 10 from the user.

When the object is a vehicle, the equipment is in-vehicle equipment, for example, a car navigation system, audio equipment for playing an optical disk, video playback equipment, air conditioning equipment, and the like, but is not limited thereto.

It should be noted that the object on which input device 1 is mounted is not limited to a vehicle. Input device 1 may be mounted on an object that receives an operation from a user, and may be mounted on, for example, a home electric appliance.

As shown in FIG. 1 and FIG. 2, input device 1 includes surface layer portion 10, main body 20, frame portion 30, vibration device 40, leaf spring 50, chassis 60, main board 70, and upper cover 80, and lower cover 90.

Surface layer portion 10 is a user interface on which a predetermined design is displayed and which accepts operations from the user. The user can control the equipment included in the vehicle by operating surface layer portion 10. Surface layer portion 10 is, for example, a plate-shaped member, and is pressed by an operation from the user.

The predetermined design is, for example, a design for controlling various equipment included in the vehicle on which input device 1 is mounted. Although FIG. 1 shows an example in which surface layer portion 10 has a plurality of designs to be displayed, the number of designs to be displayed may be one. In addition, surface layer portion 10 has first region 10a in which the design is displayed and second region 10b in which the design is not displayed.

First region 10a is a switch portion that functions as a switch in input device 1. That is, the switch portion in input device 1 is a portion where the design is displayed. The user controls the equipment by operating first region 10a according to the equipment that is desired to be controlled. It should be noted that in FIG. 1, one first region 10a is shown by a broken line frame as an example, but the shape of first region 10a is not limited thereto.

Second region 10b is a non-switch portion that does not function as a switch in input device 1. Even if the user operates second region 10b, the equipment is not controlled. Second region 10b is a region around first region 10a (a region around the design) or a region between adjacent first regions 10a (a region sandwiched between the designs). It can be said that second region 10b is a region that the user does not operate for the purpose of controlling the equipment.

Input device 1 can be disposed in a place where the user can unintentionally touch input device 1, such as an armrest or a console. That is, surface layer portion 10 can be touched by the user other than when the user operates the equipment. For example, even when the user puts his/her hand on the armrest or the like, surface layer portion 10 can be touched by the user.

When surface layer portion 10 is touched at a time other than controlling the equipment by the user, not only first region 10a but also second region 10b can be touched by the user. For example, second region 10b can be touched by the user at the same time as first region 10a. At this time, if the tactile sensation (touch) is different between first region 10a and second region 10b, the user may feel a sense of discomfort to the tactile sensation. Therefore, surface layer portion 10 according to the present embodiment is configured so that the same tactile sensation can be obtained in first region 10a and second region 10b. It should be noted that the configuration of surface layer portion 10 will be described later.

Surface layer portion 10 is fixed to main body 20 by, for example, a fastening member such as screw 15.

Main body 20 is a frame-shaped member that holds surface layer portion 10 and houses frame portion 30, vibration device 40, leaf spring 50, chassis 60, and main board 70. In the present embodiment, main body 20 holds frame portion 30 (for example, frame 32) so as to be movable (movably) In a direction (for example, frame 32 shown in FIG. 4) In which surface layer portion 10 (for example, surface layer 11) and frame portion 30 (for example, frame 32 shown in FIG. 4) are stacked when surface layer portion 10 is operated. Main body 20 includes frame portion 21 and a pair of regulating portions 22.

Frame portion 21 is a frame-shaped member, and has a size and thickness (length in the Z-axis direction) capable of accommodating frame portion 30, vibration device 40, leaf spring 50, chassis 60, and main board 70.

The pair of restricting portions 22 are provided at each end portion at one side (the Z-axis plus side in the present embodiment) of the opening of frame portion 21. Opening 23 is formed in the region sandwiched between the pair of regulating portions 22. Opening 23 is a region surrounded by frame portion 21 and the pair of restricting portions 22 in a plan view. In addition, opening 23 may have, for example, the same size as surface layer 11 of surface layer portion 10 in a plan view. Opening 23 is an opening for disposing surface layer portion 10.

Main body 20 holds surface layer portion 10 by sandwiching both ends of surface layer portion 10 in the X-axis direction between the pair of regulating portions 22 and a pair of upper covers 80. Opening 23 is closed by, for example, surface layer portion 10.

Main body 20 is formed of resin, metal, or the like, but is not limited thereto. In addition, frame portion 21 and the pair of regulating portions 22 are, for example, integrally formed, but are not limited thereto.

Frame portion 30 is movably held by main body 20 in the direction in which surface layer portion 10 and frame portion 30 are stacked (Z-axis direction) when surface layer portion 10 is operated by the user, and moves in the Z-axis direction with the operation of the user to surface layer portion 10. Frame portion 30 is held by main body 20 so as to move in the minus direction of the Z axis regardless of which of first region 10a and second region 10b is operated. Frame portion 30 moves in the minus direction of the Z axis relative to vibration device 40, chassis 60, and push-in detector 100 described later (see push-in detector 100 shown in FIG. 5), for example, by pushing leaf spring 50 that supports frame portion 30. Frame portion 30 has, for example, a plate shape and is held by main body 20 in a state parallel to surface layer portion 10.

Frame portion 30 is disposed between surface layer portion 10 and leaf spring 50, and is pushed to the Z-axis plus side by leaf spring 50. In addition, the movement of frame portion 30 in the Z axis plus direction is restricted by both ends of frame portion 30 in the X-axis direction abutting the pair of restricting portions 22 of main body 20. In frame portion 30, the initial position of frame portion 30 in the Z-axis direction is determined by the pair of regulating portions 22 and leaf spring 50. The initial position indicates the position in the Z-axis direction with surface layer portion 10 not operated by the user. It should be noted that the configuration of frame portion 30 will be described later.

Vibration device 40 is an example of a tactile force sensation presenter that stimulates the user's tactile force sensation during operation of the user to surface layer portion 10. Vibration device 40 applies, for example, a tactile force sensation to the user who operates surface layer portion 10 by vibration. Vibration device 40 is mechanically connected to frame portion 30 (for example, frame 32), and applies a tactile force sensation to the user who operates surface layer portion 10 via frame portion 30 and surface layer portion 10 by vibration. The term "mechanically connected" here means that the vibration of vibration device 40 is transmitted to frame portion 30, and that frame portion 30 can vibrate in response to the vibration of vibration device 40. In the present embodiment, vibration device 40 is directly fixed to frame portion 30.

Vibration device 40 is configured to include a vibrator that generates vibration. The vibrator may be, for example, a piezoelectric element including a piezoelectric body, or may have a configuration that operates electromagnetically such as a motor, a solenoid, or a voice coil. In addition, the vibrator may be a linear resonant actuator, an artificial muscle, a shape memory actuator, or the like.

Vibration device 40 is disposed at a position overlapping frame portion 30 in a plan view and on the side opposite to surface layer portion 10 (Z-axis minus side of frame portion 30) with respect to frame portion 30. Vibration device 40 is disposed, for example, near the center of frame portion 30 in a plan view.

It should be noted that the tactile force sensation applied to the user is not limited to vibration, but may be another force sensation or a tactile sensation such as a frictional sensation, or may be a tactile sensation applied to a sensory nerve such as an electric current stimulus. The element that applies a tactile force sensation to the sensory nerve may be an element that generates an electrostatic friction feeling. In addition, the tactile force sensation applied to the user may be, for example, a tactile force sensation applied in a non-contact manner. The element that applies a tactile force sensation in a non-contact manner may be an element that generates ultrasonic waves or an air flow.

Leaf spring 50 is disposed on the opposite side (Z-axis minus side) of frame portion 30 to surface layer portion 10, abuts frame portion 30, and is an elastic body for pushing up frame portion 30 toward surface layer portion 10 side (Z-axis plus side). In addition, leaf spring 50 bends when surface layer portion 10 is operated, and enables frame portion 30 to move in the Z-axis minus direction. Leaf spring 50 has, for example, an elastic force at an extent that does not block the vibration of frame portion 30 by vibration device 40, but the elastic force is not limited thereto.

Leaf spring 50 is, for example, a frame-shaped member, and may abut the peripheral edge portion of frame portion 30. In addition, leaf spring 50 is formed with opening 51 for disposing vibration device 40.

Screw hole 52 is formed in leaf spring 50. Leaf spring 50 is fixed to chassis 60 by, for example, a fastening member such as screw 53. In addition, leaf spring 50 is fixed to frame portion 30 by, for example, a fastening member such as screw 54.

Chassis 60 is a plate-shaped member, and leaf spring 50 is fixed thereto. Chassis 60 is formed with opening 61 for disposing vibration device 40. In addition, screw hole 63 is formed in chassis 60. Chassis 60 is fixed to main body 20 by, for example, a fastening member such as screw 64.

Main board 70 is a board on which various electronic components and the like are mounted. On main board 70, for example, a control circuit for realizing a controller (for example, controller 110 shown in FIG. 8) for controlling each component included in input device 1, and the like is mounted. Main board 70 is disposed, for example, on the opposite side (Z-axis minus side) of chassis 60 to surface layer portion 10. Main board 70 is a plate-shaped member, but is not limited thereto.

Upper cover 80 is a member that covers both ends of surface layer portion 10 in the X-axis direction in a plan view. Upper cover 80 is, for example, a plate-shaped member, and is flush with the front surface of surface layer portion 10 in a state where surface layer portion 10 and upper cover 80 are attached to main body 20. The shape of upper cover 80 is appropriately determined according to the plan-view shape of the pair of regulating portions 22. Upper cover 80 is formed of, for example, rubber, but may be formed of a resin material.

Lower cover 90 is a cover for closing the opening on the other side (Z-axis minus side in the present embodiment) of the opening of frame portion 21 of main body 20. Lower cover 90 comprises resin, metal, or the like, but is not limited thereto. Lower cover 90 may comprise the same material as main body 20. It should be noted that in FIG. 2, the illustration of lower cover 90 is omitted.

In such input device 1, frame portion 30 moves in the Z-axis minus direction by the user's operation on surface layer portion 10. Input device 1 detects the user's operation on surface layer portion 10 by detecting the movement of that frame portion 30 by push-in detector 100 disposed on the Z axis minus side of frame portion 30. In addition, vibration device 40 is mechanically connected to frame portion 30 (for example, frame 32), and applies the vibration to the user via frame portion 30 and surface layer portion 10 by vibrating when push-in detector 100 detects the movement of that frame portion 30. Detecting the movement of frame portion 30 means detecting that surface layer portion 10 has been operated.

It should be noted that vibration device 40 and upper cover 80 are not essential configurations. In addition, since input device 1 uses a tact switch as push-in detector 100 as described later, it may include only the tact switch without providing vibration device 40.

The tact switch includes, for example, a metal dome. The metal dome is a disc spring formed of stainless steel or the like, and can apply a tactile force sensation to the user. That is, the tact switch can apply a feeling of operation to the user by the metal dome. It should be noted that the tact switch is an example of push-in detector 100. In addition, in the present embodiment, a configuration in which a tact switch is used as push-in detector 100 and vibration device 40 is included will be described. With this configuration, it is possible to apply a tactile force sensation that cannot be expressed by the metal dome to the user. In addition, in the case of the tact switch not including the metal dome, it is possible to apply a tactile force sensation to the user by the configuration including vibration device 40.

[2. Configuration of Surface Layer Portion]

Figure 3:
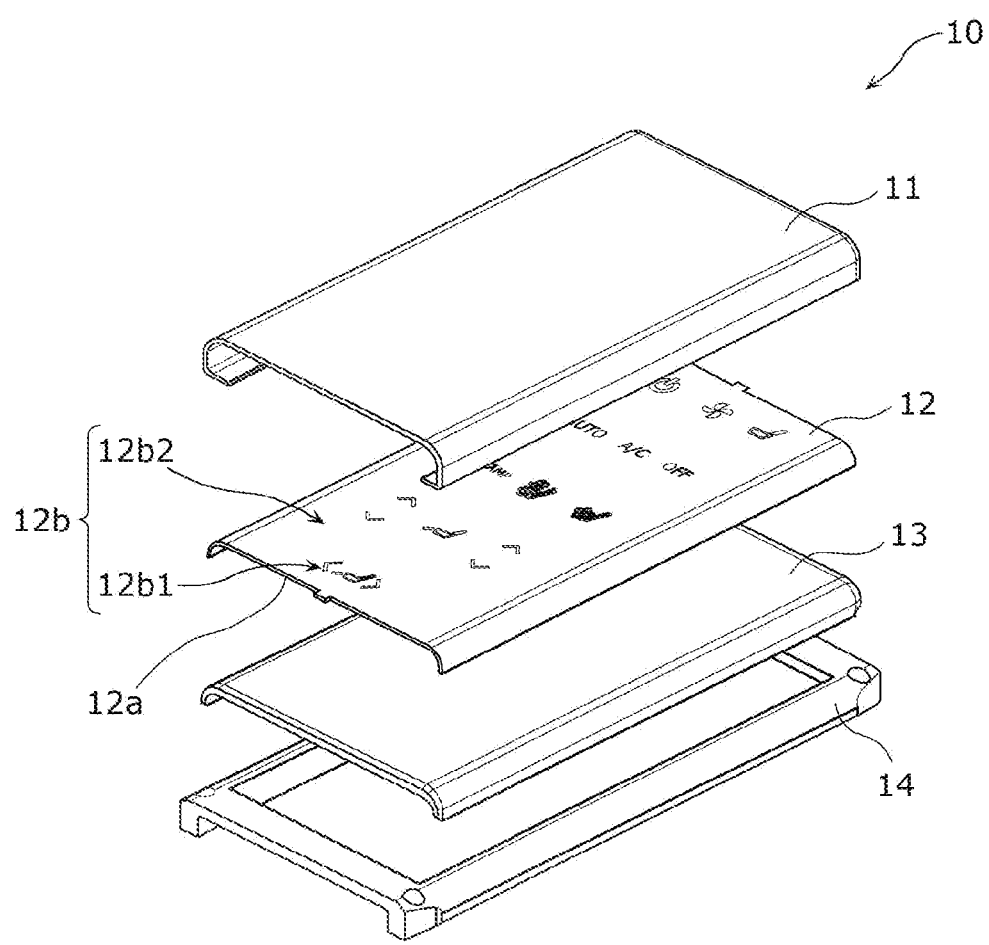
FIG. 3 is an exploded perspective view showing a surface layer portion according to the embodiment.

Next, the configuration of surface layer portion 10 will be further described with reference to FIG. 3. FIG. 3 is an exploded perspective view showing surface layer portion 10 according to the present embodiment.

As shown in FIG. 3, surface layer portion 10 includes surface layer 11, design sheet 12 as an example of the design portion, cushion layer 13, and frame body 14. In the present embodiment, surface layer 11, design sheet 12, and cushion layer 13 are stacked in this order. That is, surface layer portion 10 has a configuration in which design sheet 12 is sandwiched between surface layer 11 and cushion layer 13. In addition, surface layer 11, design sheet 12, and cushion layer 13 form a decorative layer.

Surface layer 11 is a portion which configures a surface of input device 1 and is directly touched by the user. In the present embodiment, surface layer 11 is light-transmissive so that the user can visually recognize the design. In a plan view, surface layer 11 covers both a portion of design sheet 12 on which the design is formed (for example, transmissive portion 12b1) and a portion on which the design is not formed (for example, light-shielding portion 12b2) from the front surface (Z-axis plus side surface) side of sheet portion 12a. Surface layer 11 covers, for example, entire design sheet 12 in a plan view. Surface layer 11 is integrally formed with, for example, a portion that covers transmissive portion 12b1 and a portion that covers light-shielding portion 12b2. In addition, the portion of surface layer 11 that the user touches is formed, for example, in a plate shape.

Surface layer 11 comprises, for example, a material that can reproduce the tactile sensation according to the tactile sensation of the portion where input device 1 is disposed. It is sufficient that surface layer 11 comprise, for example, a material corresponding to the material of the portion where input device 1 is disposed. When surface layer 11 is disposed to be embedded in a portion formed of a leather-like material (for example, genuine leather), surface layer 11 comprises, for example, artificial leather that is light-transmissive or the like. Surface layer 11 may be configured to impregnate a non-woven fabric with a urethane resin, or may be configured by a urethane-based thermoplastic elastomer.

Design sheet 12 is a layer which configures a design portion, and is disposed between surface layer 11 and frame portion 30, more specifically, between surface layer 11 and cushion layer 13 to form a predetermined design. In the present embodiment, design sheet 12 includes sheet portion 12a and design layer 12b formed on sheet portion 12a.

Sheet portion 12a is a base member on which design layer 12b is formed, and is, for example, a plate-shaped member that is light-transmissive. Seat portion 12a is formed of a material that is different from a material of cushion layer 13 and is light-transmissive. In addition, sheet portion 12a may be formed of a material that is more flexible than a material of surface layer 11 and has good printability. In addition, seat portion 12a may be formed of a material having a smaller repulsive force than a material of surface layer 11. Sheet portion 12a is formed to include a light-transmissive rubber. In the present embodiment, sheet portion 12a is a silicon rubber sheet formed of silicon rubber. Since sheet portion 12a is a silicon rubber sheet, design layer 12b can be easily formed on sheet portion 12a by printing. It should be noted that sheet portion 12a should not include voids from the viewpoint of suppressing deterioration of printability.

Seat portion 12a should be thin in thickness (length in the Z-axis direction) from the viewpoint of making seat portion 12a easily flexed locally when surface layer portion 10 is operated. Seat portion 12a is, for example, thinner than cushion layer 13. In addition, seat portion 12a may be thinner than surface layer 11. The thickness of sheet portion 12a may be, for example, 2.0 mm or less, more preferably 1.0 mm or less, and even more preferably 0.5 mm or less. In addition, when input device 1 is provided in a portion formed of genuine leather, thin seat portion 12a can make the tactile sensation when the user operates surface layer portion 10 closer to the tactile sensation when the genuine leather is pressed. In addition, thin sheet portion 12a makes it possible to suppress the action of the elastic force of sheet portion 12a. It should be noted that the thickness of sheet portion 12a is not limited thereto, and should be appropriately determined depending on the material and the like.

In sheet portion 12a, for example, a portion where transmissive portion 12b1 is formed and a portion where light-shielding portion 12b2 is formed are integrally formed.

Design layer 12b is a print layer formed by printing on sheet portion 12a. Design layer 12b is formed on the front surface of sheet portion 12a, but may be formed on the back surface (the surface on the Z axis minus side) of sheet portion 12a.

Design layer 12b Includes transmissive portion 12b1 that transmits light from light source 33 (see light source 33 shown in FIG. 4) included in frame portion 30, and light-shielding portion 12b2 that blocks light from that light source 33. In design layer 12b, the design is displayed by the light transmitted through transmissive portion 12b1. It should be noted that in FIG. 3, transmissive portion 12b1 is shown in black and light-shielding portion 12b2 is shown in white for the sake of clarity, but in reality, transmissive portion 12b1 is transparent, and light-shielding portion 12b2 is formed by coloring the portions other than transmissive portion 12b1 in black.

Transmissive portion 12b1 forms first region 10a, and light-shielding portion 12b2 forms second region 10b. For example, it can also be said that first region 10a is a transmission region for forming a design formed on sheet portion 12a by printing, and second region 10b is a light-shielding region formed on sheet portion 12a by printing. The transmission region may be, for example, a region in which a printing material for forming a light-shielding region is not printed. It should be noted that transmissive portion 12b1 is an example of the first portion, and light-shielding portion 12b2 is an example of the second portion.

It should be noted that design layer 12b is not limited to the above configuration, and for example, design layer 12b may be configured by printing (painting) the entire surface of sheet portion 12a in black and removing the black paint by laser cutting in a shape corresponding to transmissive portion 12b1. Therefore, in the present embodiment, printing includes not only printing the light-shielding region on sheet portion 12a but also painting the entire surface of sheet portion 12a in black.

Cushion layer 13 is a layer having a cushioning property provided to apply a soft touch to the user when the user operates surface layer portion 10. Cushion layer 13 is disposed on the back surface side (Z-axis minus side) of surface layer 11 of design sheet 12. Cushion layer 13 has, for example, voids. Since cushion layer 13 has voids, that cushion layer 13 is likely to be locally crushed when surface layer portion 10 is operated, so that it is easy to apply a soft tactile sensation to the user.

In a plan view, cushion layer 13 covers both a portion of design sheet 12 on which the design is formed (for example, transmissive portion 12b1) and a portion on which the design is not formed (for example, light-shielding portion 12b2) from the back surface side of sheet portion 12a. Then, cushion layer 13 has a light-transmissive property in order to guide the light to transmissive portion 12b1. Cushion layer 13 covers, for example, entire design sheet 12 in a plan view. Cushion layer 13 is formed in a plate shape, for example. Cushion layer 13 is integrally formed with, for example, a portion that covers transmissive portion 12b1 and a portion that covers light-shielding portion 12b2.

Cushion layer 13 is formed of a material having a higher cushioning property than a material of seat portion 12a. Cushion layer 13 is formed of, for example, an effervescent resin (for example, an effervescent urethane resin), a three-dimensional knitted fabric in which fibers are woven, or a stack of non-woven cloth.

In addition, cushion layer 13 should be thick (in the length in the Z-axis direction) from the viewpoint of making it easy to apply a soft tactile sensation to the user when the user operates surface layer portion 10. Cushion layer 13 is, for example, thicker than seat portion 12a. In addition, cushion layer 13 is thicker than surface layer 11. The thickness of cushion layer 13 may be, for example, 2.0 mm or more, more preferably 2.5 mm or more. It should be noted that the thickness of cushion layer 13 is not limited thereto, and should be appropriately determined depending on the material, foaming rate, and the like.

As described above, each of surface layer 11 and cushion layer 13 is formed so as to extend across transmissive portion 12b1 and light-shielding portion 12b2 in a plan view. It can also be said that each of surface layer 11 and cushion layer 13 is formed so as to extend across first region 10a and second region 10b in a plan view. In addition, it can also be said that each of surface layer 11 and cushion layer 13 is formed so as to extend across the switch portion and the non-switch portion in a plan view.

In the present embodiment, surface layer 11 and cushion layer 13 cover entire design sheet 12 in a plan view. For example, in a plan view, surface layer 11, design sheet 12, and cushion layer 13 may have the same size. Surface layer portion 10 has a three-layer structure of surface layer 11, design sheet 12, and cushion layer 13 in a region that the user may touch in a plan view. For example, surface layer portion 10 has a three-layer structure of surface layer 11, design sheet 12, and cushion layer 13 in both the cross-sectional structure of first region 10a and the cross-sectional structure of second region 10b, and the materials of the portion of first region 10a and the portion of second region 10b are the same in each layer.

In addition, surface layer 11, design sheet 12, and cushion layer 13 are stacked, for example, in contact with each other. In addition, surface layer 11, design sheet 12, and cushion layer 13 are held by main body 20 so that, for example, the plate-shaped portions are parallel to each other.

It should be noted that the plan view shape of surface layer 11, design sheet 12, and cushion layer 13 is rectangular, but may be square, circular, L-shaped, or the like, and the shape is not particularly limited. In addition, surface layer 11 and cushion layer 13 are not limited to covering entire design sheet 12 in a plan view, and are only needed to cover at least one first region 10a and second region 10b.

It should be noted that although the example in which design layer 12b is formed on sheet portion 12a has been described above, the present invention is not limited thereto. When surface layer 11 comprises a material capable of forming design layer 12b by printing, design layer 12b may be formed by printing directly on surface layer 11. Design layer 12b may be formed on the front surface (Z-axis plus side surface) of surface layer 11, and when surface layer 11 is light-transmissive, it may be formed on the back surface (Z-axis minus side surface) thereof.

It should be noted that when design layer 12b is formed on surface layer 11, surface layer portion 10 does not have to include seat portion 12a. That is, the design portion may include design layer 12b formed (for example, printed) on surface layer 11. In addition, for example, when design layer 12b is formed on surface layer 11, surface layer 11 and cushion layer 13 may be directly stacked. In addition, when design layer 12b is formed on the front surface of surface layer 11, that is, when the design is always visible, surface layer 11, seat portion 12a, and cushion layer 13 do not have to be light-transmissive. In this case, surface layer 11 may be formed of genuine leather or the like.

Frame body 14 is a rigid frame-shaped member, and supports the outer edge portions of surface layer 11, design sheet 12, and cushion layer 13.

It should be noted that in FIG. 3, the illustration of fixing members such as screws 15 for fixing each component is omitted.

[3. Configuration of Frame Portion]

Figure 4:
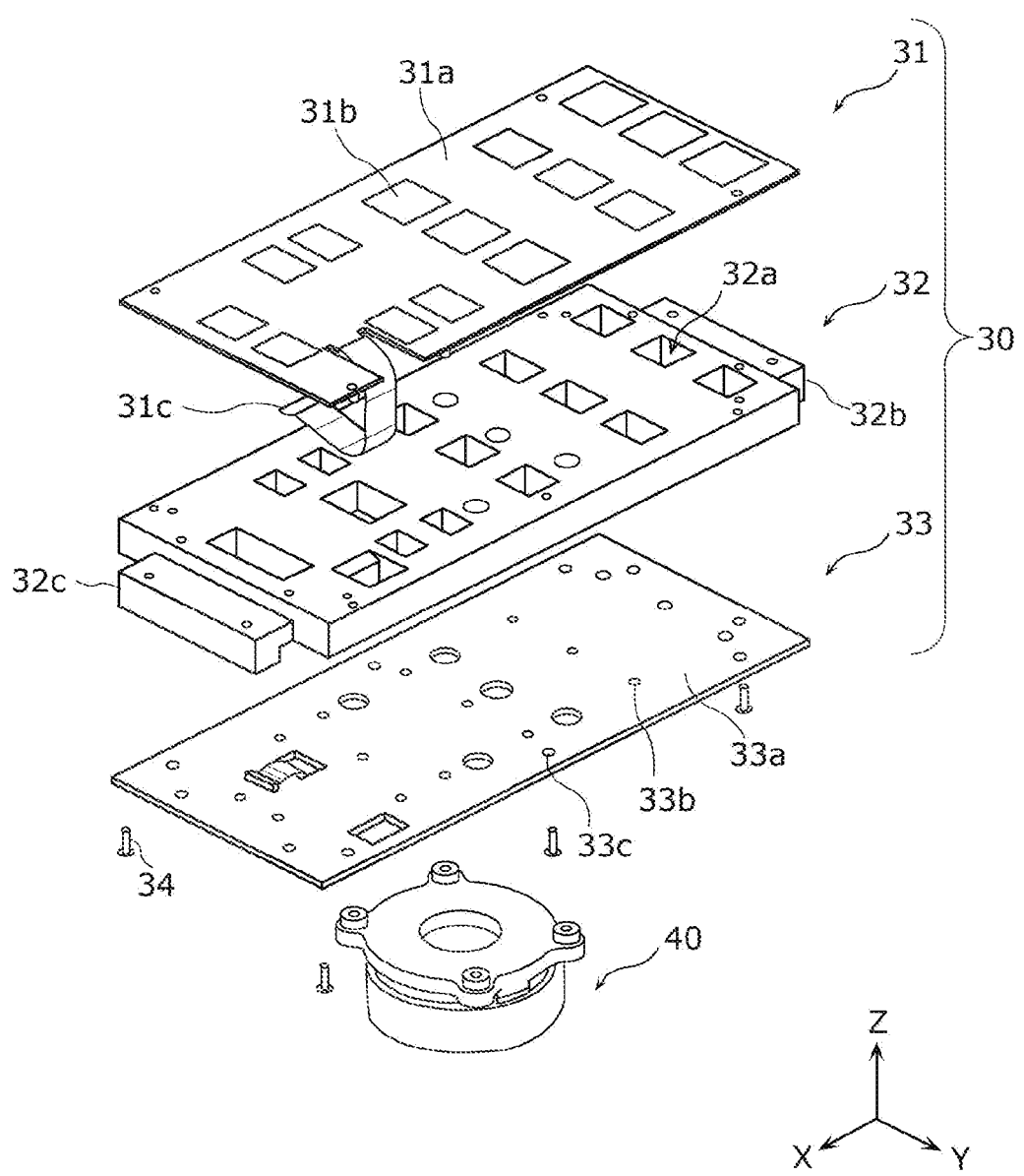
FIG. 4 is an exploded perspective view showing a frame portion according to the embodiment.

Next, the configuration of frame portion 30 will be further described with reference to FIG. 4. FIG. 4 is an exploded perspective view showing frame portion 30 according to the present embodiment. It should be noted that FIG. 4 also shows vibration device 40.

As shown in FIG. 4, frame portion 30 includes sensor film 31, frame 32, and light source 33. Frame portion 30 is disposed so as to face surface layer portion 10. In addition, vibration device 40 is disposed on the opposite side (Z-axis minus side) of light source 33 to surface layer 11.

Sensor film 31 is disposed on the opposite side (Z-axis minus side) of cushion layer 13 to surface layer 11, and is a sensor for detecting the position where the user operates (presses) surface layer 11. Sensor film 31 is disposed between cushion layer 13 and frame 32. In the present embodiment, sensor film 31 is a capacitance type sensor film (electrostatic sensor film). In a plan view, sensor film 31 covers both a portion of design sheet 12 on which the design is formed (for example, transmissive portion 12b1) and a portion on which the design is not formed (for example, light-shielding portion 12b2) from the back surface (Z-axis minus side surface) side of sheet portion 12a. It can also be said that sensor film 31 is formed so as to extend across transmissive portion 12b1 and light-shielding portion 12b2 in a plan view. Sensor film 31 covers, for example, entire design sheet 12 in a plan view. Sensor film 31 is integrally formed with, for example, a portion that covers transmissive portion 12b1 and a portion that covers light-shielding portion 12b2.

Sensor film 31 includes plate-shaped base material 31a, sensor electrodes 31b arranged on base material 31a, and flexible board portion 31c for connecting to main board 70. In the present embodiment, base material 31a and sensor electrodes 31b are light-transmissive. That is, in the present embodiment, base material 31a is a transparent board, and sensor electrodes 31b are transparent electrodes. In addition, it can also be said that sensor electrodes 31b are electrostatic sensor electrodes.

Base material 31a is a film on which sensor electrodes 31b are formed. It should be noted that base material 31a is not limited to a film, but may be a transparent board.

Sensor electrodes 31b are arranged corresponding to the designs formed on design sheet 12, and are, for example, arranged at positions facing a plurality of designs. Sensor electrode 31b is provided for each design so that at least a part of sensor electrode 31b overlaps that design in a plan view. Sensor electrode 31b is provided, for example, so as to include the design in a plan view. Sensor electrodes 31b are provided, for example, one-to-one with respect to the design.

It should be noted that sensor electrodes 31b is not limited to being provided in a plurality, and for example, when there is only one design, it is sufficient to provide only one sensor electrode 31b.

It should be noted that, for example, first region 10a may be a region in which sensor electrode 31b is provided in a plan view. In addition, for example, second region 10b may be a region in which sensor electrode 31b is not provided in a plan view.

It should be noted that sensor film 31 is not limited to the capacitance type, and may be configured to detect the position where the user operates surface layer portion 10 by using other methods such as an ultrasonic type and an electromagnetic induction type.

Flexible board portion 31c is a board for outputting the detection result of each sensor electrode 31b to main board 70. By connecting one end of flexible board portion 31c to a connector or the like of main board 70, sensor film 31 is electrically connected to main board 70.

It should be noted that sensor film 31 may include an electrostatic integrated circuit (IC) (not shown), which is a processor that detects the position where the user's finger contacts based on the change in capacitance caused by the user's contact with surface layer 11. The electrostatic IC outputs, for example, position information indicating a position where the user's finger contacts a controller (see controller 110 in FIG. 8).

Frame 32 moves in the Z-axis minus direction when surface layer portion 10 is operated by the user and is pressed from that surface layer portion 10 in the Z-axis minus direction. Frame 32 is a plate-shaped member disposed on the opposite side (Z-axis minus side) of cushion layer 13 to surface layer 11. In the present embodiment, frame 32 is disposed between sensor film 31 and light source 33. Frame 32 is rigid. In addition, in the present embodiment, frame 32 is light-transmissive.

Frame 32 is provided so as to cover surface layer 11, design sheet 12, and cushion layer 13 in a plan view. Frame 32 is formed so as to extend across first region 10a and second region 10b in a plan view. In the present embodiment, frame 32 covers the entire plate-like portion (the portion touched by the user) of surface layer 11, design sheet 12, and cushion layer 13 in a plan view. With this, frame 32 moves in the Z-axis minus direction in the same manner regardless of whether the user operates first region 10a or second region 10b. That is, frame 32 moves even when the user operates second region 10b. It should be noted that frame 32 is held by main body 20, for example, so as to be parallel to cushion layer 13.

Frame 32 is formed with through hole 32a, which is a space for transmitting light from light source 33. Through hole 32a is provided, for example, corresponding to each of the plurality of light emitting elements 33b included in light source 33. It can also be said that through hole 32a is provided, for example, corresponding to the design of design sheet 12. In addition, since light is transmitted via through hole 32a, it can be said that frame 32 is light-transmissive.

It should be noted that in the present embodiment, since the design of design sheet 12 is smaller than the fingertip, the size of through hole 32a is also smaller than the fingertip according to the size of the design. Therefore, it is not difficult for surface layer portion 10 to press due to the bending of surface layer 10 during the pressing operation. However, when the design is larger than the fingertip and through hole 32a is also enlarged correspondingly, so that surface layer portion 10 is bent during the pressing operation, a light guide body (not shown) for guiding the light from light emitting element 33b may be provided for through hole 32a. That is, frame 32 may include a light guide body in a portion of frame 32 facing the design and light source 33 (for example, light emitting element 33b). It should be noted that the light guide body is not limited to the above configuration, and may be used in a configuration in which the design is smaller than the fingertip.

In addition, through hole 32a is not limited to being formed in frame 32, and through hole 32a may not be formed. In this case, for example, frame 32 is formed by two-color molding using a light-transmissive resin and a light-shielding resin.

In addition, frame 32 includes end portion 32b which is a convex portion protruding on the X-axis minus side and end portion 32c which is a convex portion protruding on the X-axis plus side. End portion 32b and end portion 32c are, for example, portions that abut leaf spring 50.

Sensor film 31 and light source 33 are fixed to frame 32 by, for example, a fastening member such as a screw.

Light source 33 is disposed on the opposite side (Z-axis minus side) of frame 32 to cushion layer 13 to illuminate the design. Light source 33 includes board 33a and a plurality of light emitting elements 33b.

Board 33a is a plate-shaped member in which a plurality of light emitting elements 33b are arranged. Board 33a is a rigid board, but may be a flexible board.

Light emitting element 33b emits light for displaying the design. Light emitting element 33b is provided for each of the plurality of designs. Light emitting element 33b is arranged, for example, at each of the positions of board 33a facing the plurality of designs. Light emitting element 33b is, for example, a light emitting diode (LED), but it is not limited thereto.

The plurality of light emitting elements 33b may emit light of different colors (for example, colors according to the design) or one color (for example, white).

In the present embodiment, vibration device 40 is fixed to frame portion 30 together with board 33a. Therefore, board 33a and vibration device 40 are provided so as to be in direct contact with frame portion 30 regardless of whether or not frame portion 30 is moved in the Z-axis minus direction.

In such frame portion 30, when surface layer portion 10 is operated by the user, for example, sensor film 31, frame 32, and light source 33 described above move together in the Z-axis direction.

It should be noted that sensor film 31 and light source 33 are not essential configurations.

[4. Cross-Sectional Configuration of Input Device]

Figure 5:
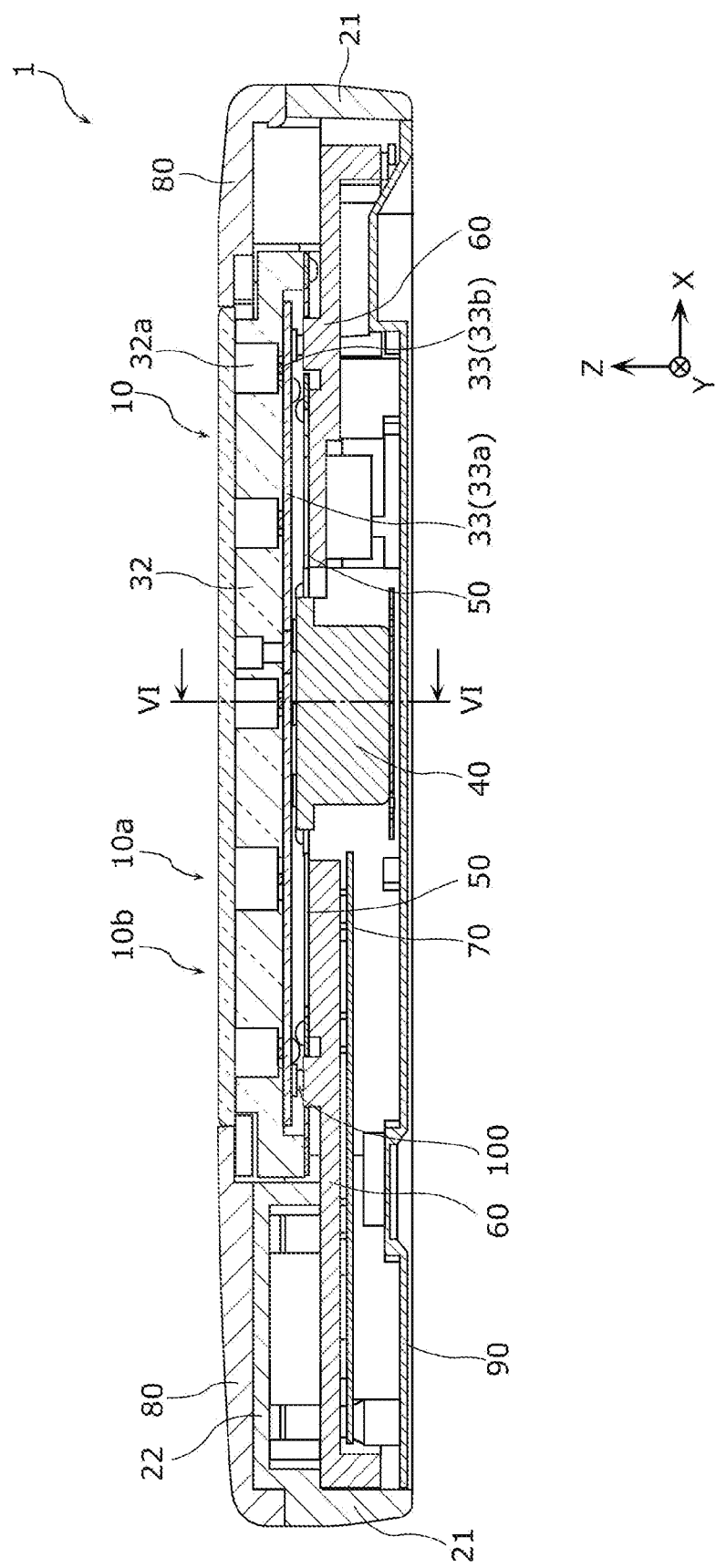
FIG. 5 is a cross-sectional view showing the input device according to the embodiment.
Figure 6:
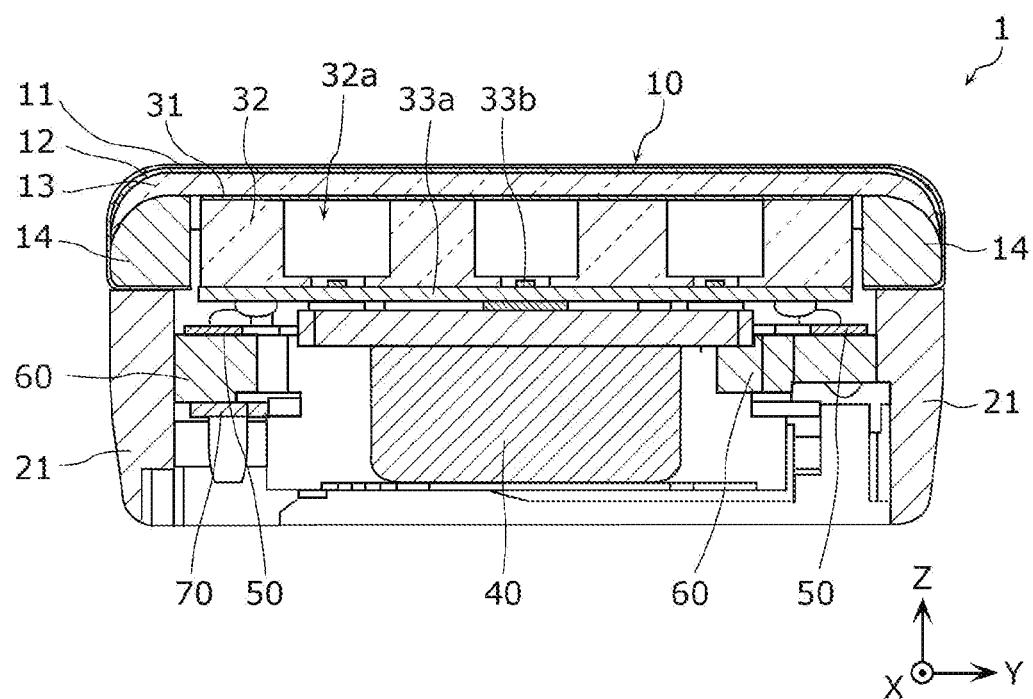
FIG. 6 is a cross-sectional view showing the input device according to the embodiment in the VI-VI line of FIG. 5.

Next, the cross-sectional configuration of input device 1 will be described with reference to FIG. 5 and FIG. 6. FIG. 5 is a cross-sectional view showing input device 1 according to the present embodiment. FIG. 6 is a cross-sectional view showing input device 1 according to the present embodiment on the VI-VI line of FIG. 5. It should be noted that FIG. 5 and FIG. 6 show cross-sectional views in a state in which surface layer portion 10 is not operated by the user, that is, in an initial state.

As shown in FIG. 5, in input device 1, surface layer portion 10, frame 32, light source 33, leaf spring 50, chassis 60, and main board 70 are held in parallel with each other in this order from the front surface side (Z-axis plus side). Surface layer portion 10 is integrally formed from the end portion on the X-axis plus side to the end portion on the X-axis minus side. That is, in each of first region 10a and second region 10b, surface layer portion 10 comprises the same structure and the same material.

The light emitted by light emitting element 33b of light source 33 passes through hole 32a and surface layer portion 10 and is emitted to the outside of input device 1. With this, input device 1 allows the user to visually recognize the display corresponding to the design formed on design sheet 12.

In addition, input device 1 may further include push-in detector 100 for detecting that the user has operated surface layer portion 10 on the opposite side (Z-axis minus side) of frame portion 30 to surface layer portion 10. Push-in detector 100 is, for example, a tact switch. In the configuration of FIG. 5, input device 1 includes two tact switches. Push-in detectors 100 is arranged, for example, at the end portion on the X-axis minus side and the end portion on the X-axis plus side of board 33a, but is not limited thereto. Push-in detector 100 is mechanically connected to frame 32. Being mechanically connected here means that push-in detector 100 can detect the movement of frame 32 in the Z-axis minus direction.

Push-in detector 100 may be a load sensor that detects the load applied to surface layer portion 10 based on the movement of frame 32 in the Z axis minus direction due to the operation of surface layer portion 10. The load sensor is not particularly limited as long as it can detect the load applied to surface layer portion 10, but is, for example, a piezoelectric sensor. That load sensor includes, for example, a piezoelectric element. It should be noted that push-in detector 100 may be, for example, a stroke sensor that detects a load applied to surface layer portion 10 as a displacement amount of frame portion 30 (for example, frame 32). That stroke sensor detects the displacement amount of frame portion 30 as the stroke amount by, for example, an optical sensor, a radio wave sensor, a sound wave sensor, or the like. That stroke sensor can detect a small stroke amount of, for example, about 0.1 mm. That stroke sensor may detect that the user has operated surface layer portion 10 by detecting, for example, a stroke amount of about 0.1 mm. It should be noted that the tact switch used in the present embodiment can also detect a stroke amount of about 0.1 mm to 0.2 mm. Push-in detector 100 outputs the detection result to controller 110 (controller 110 shown in FIG. 11) described later.

It should be noted that push-in detector 100 may be a contact type or a non-contact type. In addition, when input device 1 includes a switch such as a tact switch, the sensors such as the load sensor described above may not be included.

As shown in FIG. 6, when surface layer portion 10 is operated by the user, surface layer 11 and design sheet 12 are bent to the Z-axis minus side, and cushion layer 13 is compressed to the Z-axis minus side. That is, surface layer portion 10 is locally deformed when operated by the user. By compressing cushion layer 13, surface layer portion 10 can make the user feel a soft touch. Since surface layer portion 10 includes cushion layer 13 integrally formed over first region 10a and second region 10b, even if the user operates (for example, contacts) either first region 10a or second region 10b, the user can be made feel the same soft touch.

In addition, since frame portion 30 is integrally formed over first region 10a and second region 10b and is rigid, even if the user operates (for example, contacts) either first region 10a or second region 10b, it moves in the Z-axis minus direction without being deformed. Therefore, frame portion 30 is less likely to make the user feel the difference in tactile sensation depending on whether or not frame portion 30 is moved, for example, as compared with the case where frame portion 30 does not move even if second region 10b is operated.

Accordingly, input device 1 can apply the same tactile sensation no matter which part of surface layer portion 10 the user touches (presses), and can suppress applying a discomfort to the tactile sensation. For example, when input device 1 is disposed at a position such as an armrest that is easy for the user to touch, it is possible to suppress applying the discomfort regarding the tactile sensation to the user. For example, input device 1 can apply the same tactile sensation to the user no matter which part of surface layer portion 10 the user touches when light source 33 is not lit, so that it is possible to suppress applying the discomfort to the tactile sensation to the user. That is, when the user touches surface layer portion 10 without intending to operate the equipment, the user can feel the same tactile sensation no matter which part of surface layer portion 10 is touched.

In addition, for example, cushion layer 13 is compressed by the user's operation on surface layer portion 10. That is, when vibration device 40 generates vibration, cushion layer 13 is compressed. Therefore, input device 1 is less likely to absorb the vibration by cushion layer 13, and can effectively convey the tactile sensation of vibration device 40 to the user (to the user's finger). In addition, when input device 1 includes the tact switch, the click feeling of the tact switch is not easily absorbed by cushion layer 13, so that input device 1 can effectively convey the click feeling to the user. That is, input device 1 can reduce the discomfort to the tactile sensation applied to the user without impairing the tactile force sensation applied to the user.

It should be noted that in FIG. 6, surface layer 11, design sheet 12, and cushion layer 13 are formed so as to extend across frame 32 and frame 14 in a plan view, but the present disclosure is not limited thereto, and they are only needed to be formed so as to cover at least frame 32. For example, surface layer 11, design sheet 12, and cushion layer 13 may have the same size as frame 32 in a plan view. In addition, an example in which surface layer 11, design sheet 12, and cushion layer 13 are curved to the Z-axis minus side (the side opposite to the front surface of input device 1) with proximity to the Y-axis plus side according to the shape of frame body 14 is shown in FIG. 6, but the present disclosure is not limited thereto, and they may be in a flat-plate shape. In addition, the end portion of surface layer 11 on the Y-axis plus side is located, for example, between frame body 14 and frame portion 21. With this, surface layer 11, design sheet 12, and cushion layer 13 can be fixed to frame body 14.

[5. Other Overall Configuration of Input Device]

Figure 7:
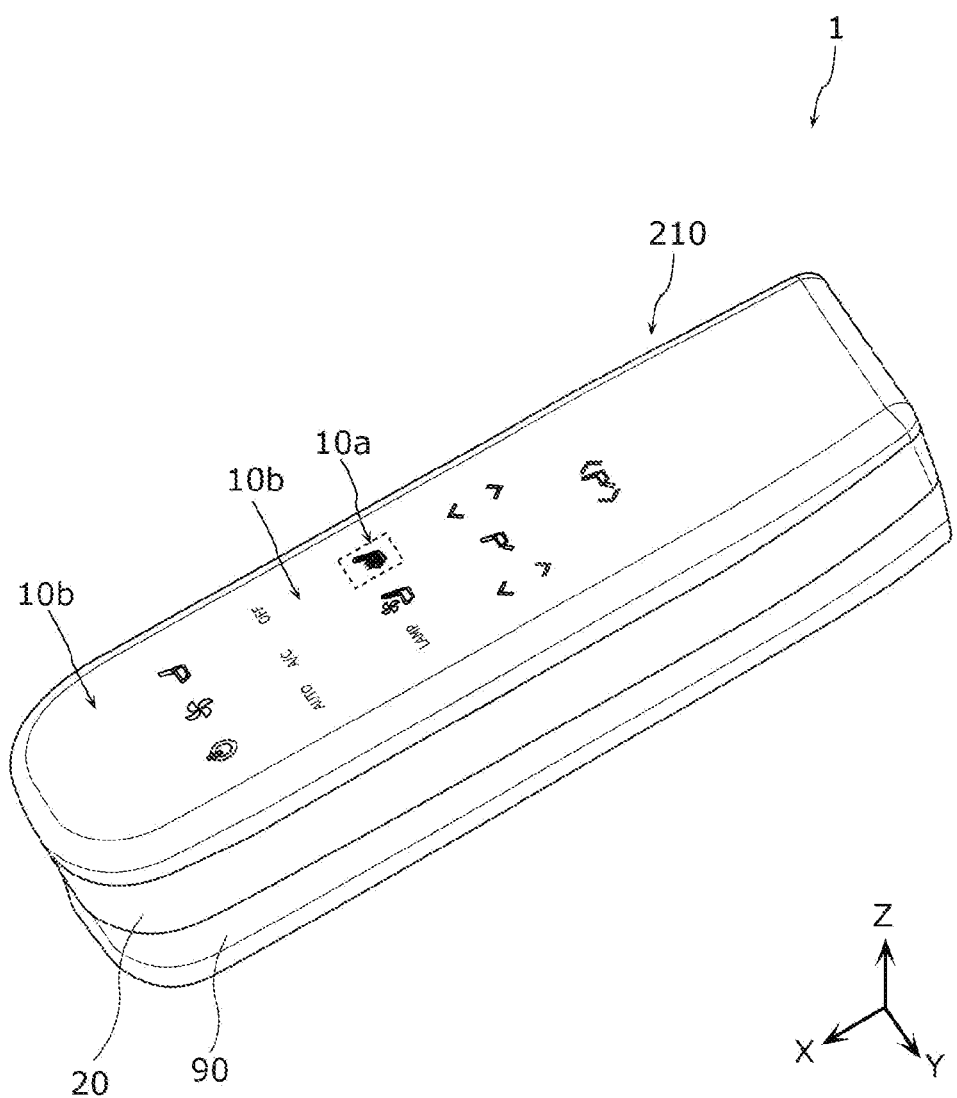
FIG. 7 is a perspective view showing another example of the appearance of the input device according to the embodiment.

In the above, an example in which the front surface (the surface on the Z-axis plus side) of input device 1 includes surface layer portion 10 and upper cover 80 has been described, but the present disclosure is not limited thereto. Another configuration of input device 1 will be described with reference to FIG. 7. FIG. 7 is a perspective view showing another example of the appearance of input device 1 according to the present embodiment.

As shown in FIG. 7, input device 1 may be configured such that surface layer portion 210 covers the entire front surface of input device 1 in a plan view. Here, the front surface refers to an XY plane (operation surface) Including first region 10a on which the design is displayed. For example, a decorative layer formed by laminating surface layer 11, design sheet 12, and cushion layer 13 in this order may cover the entire front surface of input device 1. That is, input device 1 does not have to include upper cover 80.

In addition, in a plan view, frame portion 30 may also be formed so as to cover the entire front surface of input device 1. Frame portion 30 covers, for example, a region (for example, a plate-shaped region) that the user may touch in surface layer portion 210, and is disposed so as to face that region.

With this, input device 1 can apply the same tactile sensation to the user no matter which part of the front surface of input device 1 is operated. In addition, since input device 1 is seamless on the front surface, the appearance of input device 1 can be improved, and the operation feeling can be made uniform on the entire front surface.

It should be noted that surface layer portion 210 is not limited to the above-mentioned front surface, and may be configured to include main body 20 and lower cover 90 and cover the front surfaces thereof. In this case, the same tactile sensation as the operation surface can be obtained on the side surface of input device 1.

[6. Functional Configuration of Input Device]

Figure 8:
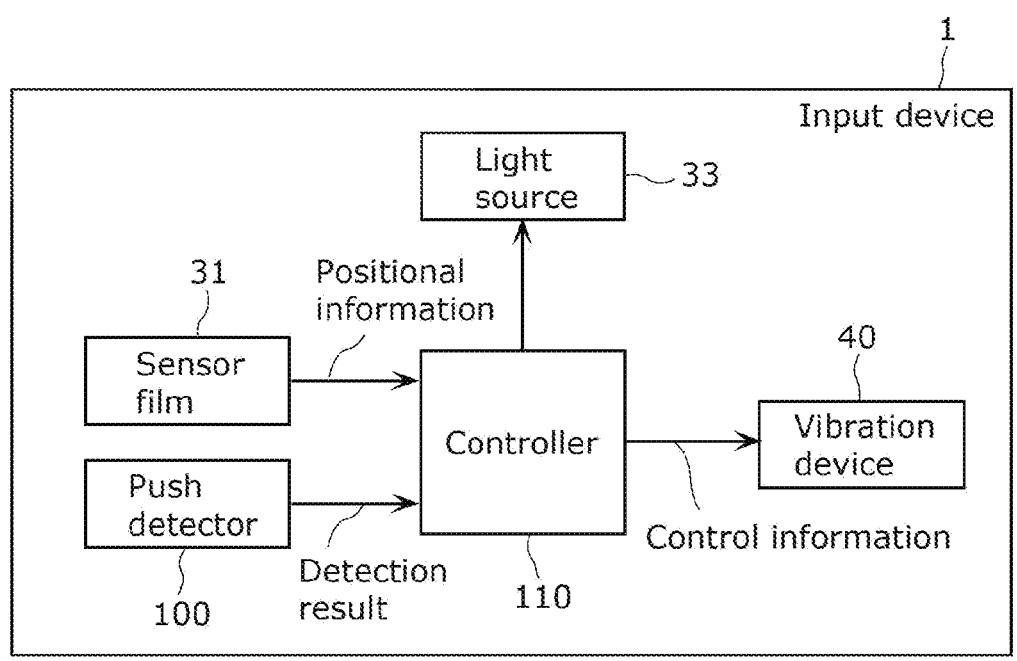
FIG. 8 is a block diagram showing a functional configuration of the input device according to the embodiment.

Next, the functional configuration of input device 1 will be described with reference to FIG. 8. FIG. 8 is a block diagram showing a functional configuration of input device 1 according to the present embodiment.

As shown in FIG. 8, input device 1 includes sensor film 31, light source 33, vibration device 40, push-in detector 100, and controller 110 as functional configurations.

Controller 110 is a control device that controls each component of input device 1. Controller 110 controls light source 33 to emit light, thereby displaying the design. In addition, controller 110 determines which design the user has operated based on the position information from sensor film 31, and performs control according to the operated design. It should be noted that controller 110 may execute the process performed by the electrostatic IC described above.

In addition, when controller 110 acquires a detection result indicating that the user has operated surface layer portion 10 from push-in detector 100, controller 110 outputs control information for vibrating vibration device 40. For example, controller 110 acquires that the user has operated surface layer portion 10 from the detection result of push-in detector 100, and acquires the position operated by the user (which design has been operated) based on the position information from sensor film 31. Then, controller 110 outputs a control signal according to the design operated by the user to the outside. Furthermore, controller 110 may vibrate vibration device 40 in a mode (for example, frequency, vibration intensity, and the like) according to the design operated by the user.

It should be noted that controller 110 acquires the detection result from push-in detector 100 when second region 10b is operated by the user, but does not acquire the position information from sensor film 31. In this case, controller 110 does not output control information for vibrating vibration device 40. That is, controller 110 does not vibrate vibration device 40. Controller 110 outputs control information for vibrating vibration device 40, for example, when both the position information from sensor film 31 and the detection result from push-in detector 100 are acquired.

Controller 110 may be realized by, for example, a processor that executes a program for controlling each component and a memory that stores that program, or may be realized by a dedicated circuit. Controller 110 may be realized by, for example, an electronic control unit (ECU).

Here, the operation of controller 110 will be described with reference to FIG. 9. FIG. 9 is a timing chart showing the operation of input device 1 according to the present embodiment. Specifically, FIG. 9 shows a process for the detection result of push-in detector 100 in controller 110.

As shown in FIG. 9, controller 110 determines whether or not to treat the detection result (output) from push-in detector 100 as a valid detection result according to the lighting state of light source 33. Controller 110 determines that the detection result from push-in detector 100 when light source 33 is lit is a valid detection result. That is, when controller 110 acquires the detection result from push-in detector 100 between time t1 and time t2 shown in FIG. 9, it determines that the user's operation has been performed, vibrates vibration device 40, and performs control based on the position information of sensor film 31. In addition, controller 110 determines that the detection result from push-in detector 100 when light source 33 is not lit is an invalid detection result. That is, if controller 110 acquires the detection result of push-in detector 100 at a time other than between time t1 and time t2 shown in FIG. 9, it determines that no operation has been performed by the user and does not perform the process. That is, controller 110 does not vibrate vibration device 40 and does not perform control based on the position information of sensor film 31.

In this way, controller 110 processes the detection result from push-in detector 100 when light source 33 is lit as a valid detection result. For example, when light source 33 is lit and first region 10a is operated, controller 110 processes the detection result of push-in detector 100 as a valid detection result.

It should be noted that the lighting state indicates, for example, lighting and non-lighting of light source 33, but the lighting state is not limited thereto.

OTHER EMBODIMENTS

Although input device 1 according to one or more aspects has been described above based on the embodiment and the like, the present disclosure is not limited to this embodiment and the like. Forms obtained by applying various modifications to the embodiment and the like conceived by a person skilled in the art or forms constructed by combining the components in different embodiments without departing from the spirit of the present disclosure may also be included in this disclosure.

For example, in the above embodiment, an example in which surface layer 11, design sheet 12, and cushion layer 13 are directly contacted and stacked in this order has been described, but the present disclosure is not limited thereto. Another plate-shaped layer may be provided at least one of between surface layer 11 and design sheet 12 or between design sheet 12 and cushion layer 13. That plate-shaped layer should be a layer having a cushioning property.

In addition, in the above embodiment, the example in which input device 1 includes two push-in detectors 100 for a plurality of designs has been described, but the number of push-in detectors 100 is not limited thereto, and single push-in detector 100 may be included or three or more push-in detectors 100 may be included.

In addition, in the above embodiment, an example in which the design is displayed by the light transmitted through design sheet 12 has been described, but the present disclosure is not limited thereto, and input device 1 may be configured to display the design by the light shielded by design sheet 12.

In addition, in the above embodiment, an example in which light source 33 has a plurality of light emitting elements 33b has been described, but light source 33 may be, for example, one surface light source.

In addition, the division of the functional block in the block diagram is an example, and a plurality of functional blocks may be realized as one functional block, one functional block may be divided into a plurality of functional blocks, and some functions may be transferred to other functional blocks. In addition, the functions of a plurality of functional blocks having similar functions may be processed by a single hardware or software in parallel or in a time division manner.

In addition, in the above embodiment, each component (for example, a controller) may be configured by dedicated hardware or may be realized by executing a software program suitable for each component. Each component may be realized by a program executor such as a CPU or a processor reading out and executing a software program recorded on a recording medium such as a hard disk or a semiconductor memory.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2020-181347 filed on Oct. 29, 2020.

INDUSTRIAL APPLICABILITY

The present disclosure is useful for input devices and the like that accept operations from users.

The invention claimed is:

1. An input device, comprising:
a surface layer;
a design portion disposed on a side of a front surface or a side of a back surface of the surface layer;
a cushion layer disposed on the side of the back surface of the surface layer and having a void in the cushion layer;
a frame in a plate shape disposed on a side of the cushion layer which is opposite to a side of the cushion layer where the surface layer is located;
a main body that movably holds the frame in a first direction in which the surface layer and the frame are stacked, when the surface layer is pressed; and
a push-in detector that is mechanically connected to the frame,
wherein the design portion includes a first portion in which a design is disposed and a second portion in which the design is not disposed in a plan view, and
each of the surface layer and the cushion layer extends across each of the first portion and the second portion in the plan view.

2. The input device according to claim 1,
wherein the design portion includes a design sheet,
the design sheet is disposed between the surface layer and the frame,
the surface layer, the cushion layer, and the frame are light-transmissive, and
the input device further comprises a light source for illuminating the design on a side of the frame which is opposite to a side of the frame where the cushion layer is located.

3. The input device according to claim 2,
wherein the design sheet is light-transmissive and includes a silicon rubber sheet on which the design is disposed,
the first portion is a transmission region for forming the design, the transmission region being printed on the silicon rubber sheet, and
the second portion is a light-shielding region printed on the silicon rubber sheet.

4. The input device according to claim 2,
wherein the surface layer, the design sheet, and the cushion layer cover an entire front surface of the input device.

5. The input device according to claim 2,
wherein when the light source is lit and a region corresponding to the first portion is pressed, an output of the push-in detector becomes valid.

6. The input device according to claim 2, further comprising:
a light guide body in a portion of the frame facing the design and the light source.

7. The input device according to claim 2,
wherein the design sheet has a repulsive force smaller than a repulsive force of the surface layer.

8. The input device according to claim 1,
wherein the design portion is a print layer obtained by printing the design on the front surface of the surface layer.

9. The input device according to claim 1,
wherein the push-in detector is a tact switch.

10. The input device according to claim 1, further comprising:
a vibration device that is mechanically connected to the frame and vibrates when the push-in detector detects that the surface layer is pressed.

11. The input device according to claim 10,
wherein the vibration device operates with the cushion layer compressed.

12. The input device according to claim 1, further comprising:
an electrostatic sensor film which is disposed on a side of the cushion layer which is opposite to a side of the cushion layer where the surface layer is located and extends across each of the first portion and the second portion in the plan view.

13. The input device according to claim 12,
wherein a plurality of designs are disposed in the design portion, each of the plurality of designs being the design,
the electrostatic sensor film is configured in such a manner that electrostatic sensor electrodes are each arranged at a corresponding one of positions corresponding to the plurality of designs.

14. The input device according to claim 1,
wherein the frame extends across each of the first portion and the second portion, and when the surface layer corresponding to the first portion is pressed, the frame moves along the first direction, and when the surface layer corresponding to the second portion is pressed, the frame moves along the first direction.

15. The input device according to claim 1, wherein the cushion layer comprises an effervescent resin.

16. The input device according to claim 1, wherein the cushion layer comprises a three-dimensional knitted fabric or a stacked body of non-woven cloth.

17. The input device according to claim 1, wherein the cushion layer has a thickness greater than a thickness of the design sheet.

18. The input device according to claim 1, wherein the first portion is a switch portion that functions as a switch in the input device, and the second portion is a non-switch portion that does not function as a switch in the input device.

19. The input device according to claim 1, further comprising:

a cover, wherein the surface layer, the design, and the cushion layer are stacked in stated order to constitute a surface layer portion, the main body includes a pair of regulating portions spaced apart in a second direction in the plan view, and an opening that is sandwiched between the pair of regulating portions and over which the surface layer portion is disposed, the pair of regulating portions and the cover hold the surface layer portion by sandwiching both ends of the surface layer portion in the second direction, and the front surface of the surface layer in the surface layer portion and a front surface of the cover are flush with each other.

20. A control method of an input device, the input device including:

a surface layer;

a design portion disposed on a side of a front surface or a side of a back surface of the surface layer;

a cushion layer disposed on the side of the back surface of the surface layer and having a void in the cushion layer;

a frame in a plate shape disposed on a side of the cushion layer which is opposite to a side of the cushion layer where the surface layer is located;

a main body that movably holds the frame in a direction, in which the surface layer and the frame are stacked, when the surface layer is pressed;

a push-in detector that is mechanically connected to the frame; and a light source for illuminating the design on a side of the frame opposite to the cushion layer, wherein the design portion includes a first portion in which a design is disposed and a second portion in which the design is not disposed in a plan view, and each of the surface layer and the cushion layer extends across each of the first portion and the second portion in the plan view, the control method comprising:

determining that a result of detecting by the push-In detector when the light source is lit and the first portion is operated is a valid detection result, and determining that a result of detecting by the push-in detector when the light source is not lit is an invalid detection result.

\* \* \* \* \*